(12) United States Patent
Van Ochten et al.

(10) Patent No.: US 6,473,287 B1
(45) Date of Patent: Oct. 29, 2002

(54) APPARATUS AND METHOD FOR STUNNING ANIMALS FOR SLAUGHTER

(75) Inventors: Sander Antonie Van Ochten, Arnhem; Ronald Theodoor Duitshof, Dinxperlo, both of (NL)

(73) Assignee: Stork MPS B.V. (NL)

( * ) Notice: Subject to any disclaimer, the term of this patent is extended or adjusted under 35 U.S.C. 154(b) by 0 days.

(21) Appl. No.: 09/497,351

(22) Filed: Feb. 3, 2000

(30) Foreign Application Priority Data

Feb. 3, 1999 (NL) .............................................. 1011208

(51) Int. Cl.$^7$ ................................................ H02N 2/00
(52) U.S. Cl. ...................................................... 361/232
(58) Field of Search ................................ 119/843–845; 452/52, 53, 57, 58, 65, 66, 177, 178, 179, 180, 181, 182, 183, 184; 361/232, 230

(56) References Cited

U.S. PATENT DOCUMENTS 5,852,989 A  * 12/1998 Fuchs ......................... 119/843

FOREIGN PATENT DOCUMENTS

| AU | 571286 | 4/1988 | ............ A22B/1/00 |
| DE | 8701791 | 6/1988 | ............ A22B/3/00 |
| EP | 0524647 | 1/1993 | ............ A22B/3/00 |

OTHER PUBLICATIONS

International Search Report issued in NL 1011208 Feb. 3, 1999.

* cited by examiner

*Primary Examiner*—Ronald W. Leja
(74) *Attorney, Agent, or Firm*—Kilpatrick Stockton LLP

(57) ABSTRACT

The invention relates to an apparatus for stunning animals, such as pigs, for slaughter and may include a conveyor for conveying stunned animals for slaughter, at least one stunning device coupled to the conveyor, and a measuring and control device for detecting the number of animals stunned by the stunning device and actuating the stunning device based on the detected number of stunned animals. The invention also relates to a method for stunning animals for slaughter, such as pigs, that includes feeding stunned animals for slaughter to a conveyor at a rate based on the previous outfeed of the stunning device.

18 Claims, 2 Drawing Sheets

APPARATUS AND METHOD FOR STUNNING ANIMALS FOR SLAUGHTER

Figure 1:
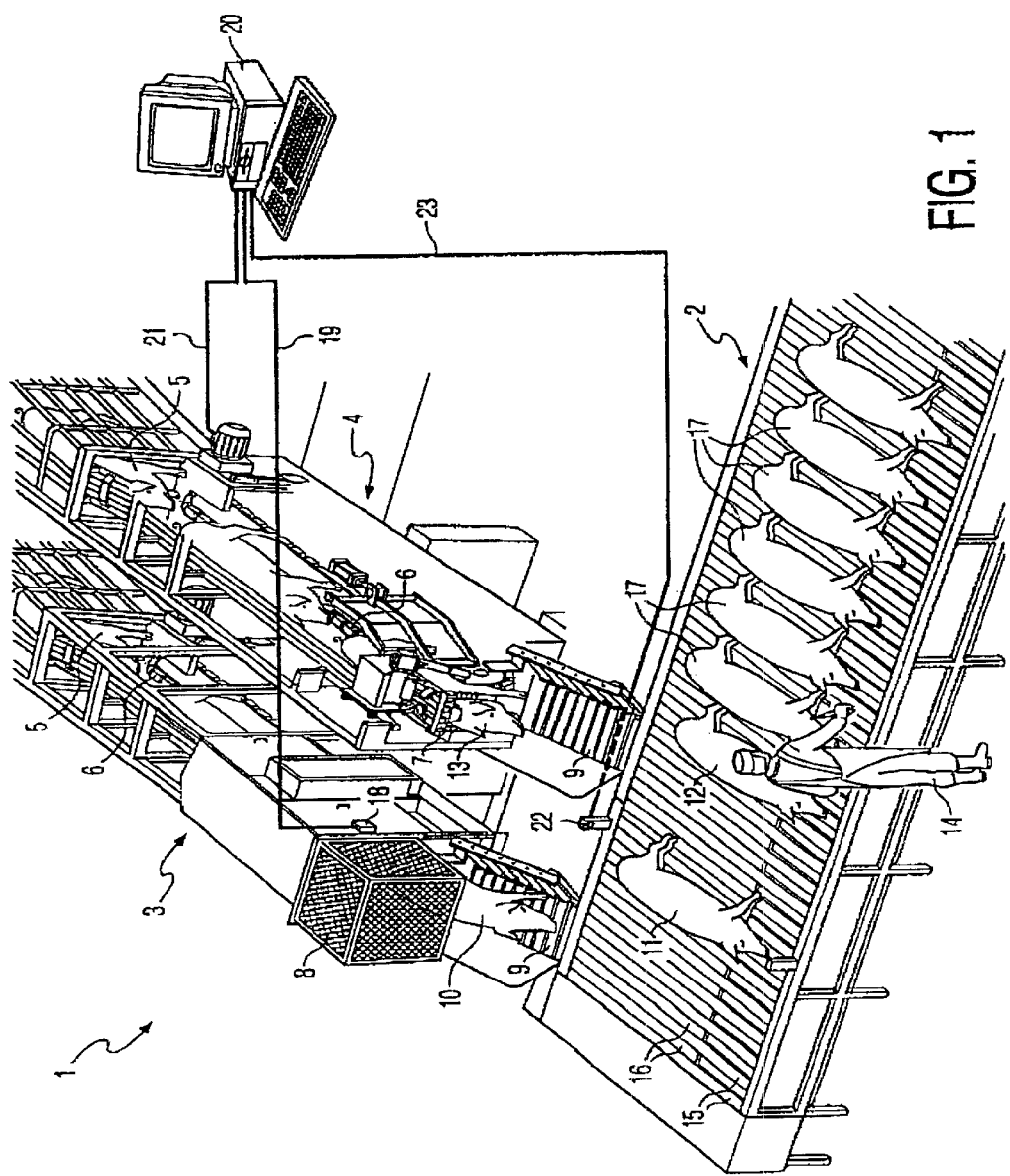

The invention relates to an apparatus and method for stunning animals for slaughter.

In the slaughtering of animals, in particular pigs, on industrial scale the animals are usually stunned in a stunning device and then killed in stunned state. The stunned or anaesthetized animals for slaughter are placed on a conveyor to be carried to a location where the animals are stuck. Stuck or sticking refers to the process of bleeding the animal, such as by cutting the throat of the animal or the like. A drawback, of the existing devices and methods is that the mutual distances between the sued animals on the conveyor cannot be controlled. The reason for this is that the feed of the living animals for slaughter into the stunning device is not always so simple; there are struggling animals which cause the distance from a preceding animal to be greater than desired. The feed of living animals is found in practice to be a process which cannot be fully controlled. In addition, it is impossible to place a sufficiently large buffer of stunned animals between the stunning device and the conveyor because it is important that the time between stunning of an animal and sticking thereof be as short as possible. Stunning is in any case of only limited duration and the quality of the meat benefits from the pig being stuck a short time after the stunning.

The Australian patent AU 571 286 describes an assembly for enclosing animals, in addition to an apparatus and method for processing animals. Use is made herein of displaceable means for determining the position of a foremost body part of an animal. The displaceable means bound the forward movement of an animal in combination with a bracket assembly with which the position of the annual is fixed relative to the displaceable means. The bracket assembly engages on the neck of the animal. The displaceable means, and the bracket assembly are coupled for control purposes to operating means. The described apparatus is also provided with sensor means for monitoring and controlling the progress of the process.

The present invention has for its object to provide an apparatus and method for stunning animals for slaughter with which the mutual distances between stunned animals on a conveyor can be controlled and the time between stunning of an animal for slaughter and the actual sticking of the stunned animal remains limited. It is also an objective to control the stunning capacity such as to enable a direct coupling between a stunning. device and a further processing, such as for instance hooking-on. This results in better capacity utilization of the further processes.

The invention provides for this purpose an apparatus for stunning animals for slaughter, in particular pigs, comprising: a conveyor for stunned animals for slaughter, at least one stunning device which connects onto the conveyor, and measuring and control means for detecting the production of the stunning device and actuating the stunning device subject to the detected production. The apparatus according to the invention has the very significant advantage that the intervals at which animals for slaughter can be stunned are controllable. It hereby becomes possible to place animals for slaughter for instance at mutually equal distances on the conveyor. Further processing of stunned animals for slaughter with mutually equal spacing has a number of advantages. Sticking is simplified; this can take place at more or less fixed intervals. Removal of the stuck animals from the conveyor is hereby also simplified, particularly when the production capacity of the stunning device is synchronized with for instance the hooking-on. If the speed of the hooks from which the slaughtered animals must be suspended is synchronized with the intervals at which the stuck animals are supplied, the work of hooking-on is simplified. It is moreover possible in this way to load all supplied hooks with a stuck animal, which results in a better utilization of the capacity of all the processes linked in fixed sequence.

The measuring and control means are preferably coupled to the stunning device and are preferably also adapted to actuate the stunning device such that it delivers stunned animals at constant time intervals. In a particular preferred embodiment the measuring and control means and the stunning device are adapted to accelerate and decelerate the stunning device during production, for instance by starting or stopping it. The production of the stunning device can thus be limited for a time (for instance stopped) so as to thus reduce the supply of animals for slaughter. Acceleration of the stunning device results in an increase in the supply of animals for slaughter. The time between the stunning and sticking of an animal can remain unvarying in such an apparatus, while stunned animals can still be delivered at constant time intervals. Another possibility is to place a displaceable stop in the stunning device with which animals for slaughter can be stopped for a time and released at the correct moments. Electrical electrodes with which a stunning can take place can for instance also be utilized as displaceable stop.

In a preferred embodiment the apparatus comprises at least two stunning devices and the measuring and control means detect the production of a first stunning device and actuate another stunning device subject to the detected production. There is therefore a stunning device, the capacity of which is utilized in more or less conventional manner. This first stunning device will discharge stunned animals at more or less random moments with differing mutual spacing. It is also possible that the outfeed from the first stunning device comes to a complete halt due to for instance a malfunction. This preferred embodiment provides at least one additional stunning device which can likewise supply stunned animals on demand to the conveyor. When a mutual spacing occurs between the stunned animals supplied by the first, also referred to as "master", stunning device such that an extra animal can be placed on the conveyor between these animals, the second stunning device receives an actuating signal whereby the empty space on the conveyor is filled with a stunned animal from the second stunning device.

For a precise control of the mutual spacing between all stunned animals for slaughter placed on the conveyor, it is of course recommended that the production of all the stunning devices connecting onto the conveyor be controlled by measuring and control means which may or may not be integrated with each other.

In a variant hereof the maximum production capacity of one or more master stunning devices is utilized but the outfeed from this (these) device(s) is still placed at the possible positions of the conveyor by means of for instance displaceable stops. The positions left open on the conveyor can then be filled by one or more following or "slave" stunning devices.

For problem-free loading the invention also provides an apparatus with a conveyor which is divided into a plurality of segments, which segments connect successively onto each other and are driven such that they can transport animals for slaughter at different transporting speeds. A segment on which the stunned animals for slaughter are placed on the conveyor herein preferably moves at higher speed than a following segment on which the stunned animals for slaughter are stuck or for instance chained. The higher speed of the prior segment of the conveyor on which the animals for slaughter are placed has the advantage that the interspacing between the animals can be relatively great there, whereby there is a reduced danger of the animals being brought into contact with each other during placing on the conveyor. A following segment of the conveyor to which the animals are subsequently transferred has a lower transporting speed, with the advantage that the stunned animals move less quickly during sticking, which simplifies the sticking work. It is also noted in this respect that it is also possible to place an individual sticker after each stunning device. Because that part of the conveyor which transports animals at higher speed can have a limited length, the total length of the apparatus can also be reduced by means of this preferred embodiment. An advantage deriving herefrom is that the installation length of the apparatus can remain limited. The animals also move less quickly during hooking-on, which simplifies hooking-on.

In a particular preferred embodiment the apparatus is provided with correction means for displacing animals for slaughter relative to the conveyor. The correction means can herein form part of the conveyor, although the correction means can also be disposed independently of the conveyor. Using the correction means relatively minor modifications can be made in the mutual spacing between animals for slaughter once they have already been stunned and placed on the conveyor in order to thus obtain an even more accurate mutual spacing between the animals for slaughter on the conveyor. This can for instance be realized by providing the conveyor with carrier elements, such as rollers, which can be controlled independently of each other such that individual animals for slaughter are displaceable over a limited distance relative to the conveyor. Such a displacement can take place in the transporting direction as well as in a direction opposed to the transporting direction. Another option is for instance to place a displaceable stop after the stunning device with which individual stunned annals can be stopped for a variable time such that release thereof results in a correct positioning of a stunned animal for slaughter on the conveyor. Similarly, it is also possible to push animals forward with the displaceable stop so that they are thus urged in forward direction to the desired location on the conveyor. Although the correction means are very suitable for use in combination with the apparatus according to the invention, they can also be applied independently of such an apparatus. The correction means as described here can thus also be applied for instance with a prior art stunning device.

The stunning devices preferably connect successively onto the conveyor, and a first stunning device, the production of which is measured, connects in the transporting direction of the conveyor onto the conveyor for an associated actuated second stunning device The advantage of this embodiment is that the feedback time from the actuating first stunning device to the actuated second stunning device is as long as possible.

The measuring and control means preferably comprise at least one sensor for detecting the production of at least one stunning device and/or they comprise a computer for converting the measurement values into control signals. Each stunning device can be provided with separate measuring and control means to which production information can be supplied using one or more sensors.

For the most precise possible measurement of the production it is recommended to place at least one sensor close to or even following the actual stunning process. It is thus possible to dispose a sensor close to the conveyor, whereby the variations which occur during placing of a stunned animal for slaughter on the conveyor are also compensated by the measuring and control means. An optional computer arranged in the measuring and control means is preferably also provided with input means for inputting the control of the variables influencing production. The production of a stunning device can be accurately detected in simple manner by means of a sensor. The computer for control can consist of a "personal computer" (PC) to which by means of a keyboard or touch screen extra control signals can be fed relating to for instance production speed, distribution of the production over a plurality of stunning devices, and so on.

In a preferred embodiment the stunning devices are provided with belly conveyors for transporting the animals for slaughter in the stunning devices. The stunning device can herein be provided with electrical stunning means and/or gas stunning means. Animals for slaughter can be carried through a stunning device in relatively calm manner with belly conveyors. A drawback of the use of a belly conveyor is that it is not easy to load, which can result in under-utilization of a stunning device. This drawback can be compensated with the apparatus according to the invention. One possibility of controlling the capacity of a stunning device with belly conveyor is for the drive of the belly band to be controllable by the measuring and control means. Analogously to an above described preferred embodiment, the belly conveyor can thus be brought to a stop when there is the danger of animals for slaughter being stunned at too short intervals.

In yet another preferred embodiment the conveyor is a belt conveyor for prone transport of stunned animals for slaughter. The stunned animals can be automatically placed in prone position on a belt conveyor, which is also suitable for further processes such as for instance sticking and draining blood. An example of a suitable belt conveyor, also referred to as a moving table, is an apron conveyor.

The invention also provides a method for stunning animals for slaughter, in particular pigs, wherein at least one stunning device feeds stunned animals for slaughter to a conveyor and the outfeed of the stunning device is subject to the previous outfeed of the stunning device. In a preferred application of the method the outfeed of the stunning device is regulated such that it delivers stunned animals at constant time intervals, This can for instance be realized in that the measuring and control means regulate the outfeed of the stunning device by accelerating and decelerating the stunning device daring production. In another preferred application of the method at least two stunning devices feed stunned animals for slaughter to a conveyor and the outfeed of at least one stunning device is regulated subject to the previous output of at least one other stunning device. According to a preferred method a first stunning device actuating another stunning device herein feeds the animals for slaughter to the conveyor at a position which in the transporting direction of the conveyor is located prior to the feed position of the associated actuated second stunning device. With these methods the advantages can be realized as described above with reference to the apparatus according to the invention, in particular the productivity of a whole slaughter line can hereby increase. The method can be performed with a stunning device of random type, such as for instance an electrical stunning device or a gas stunning device.

Figure 2:
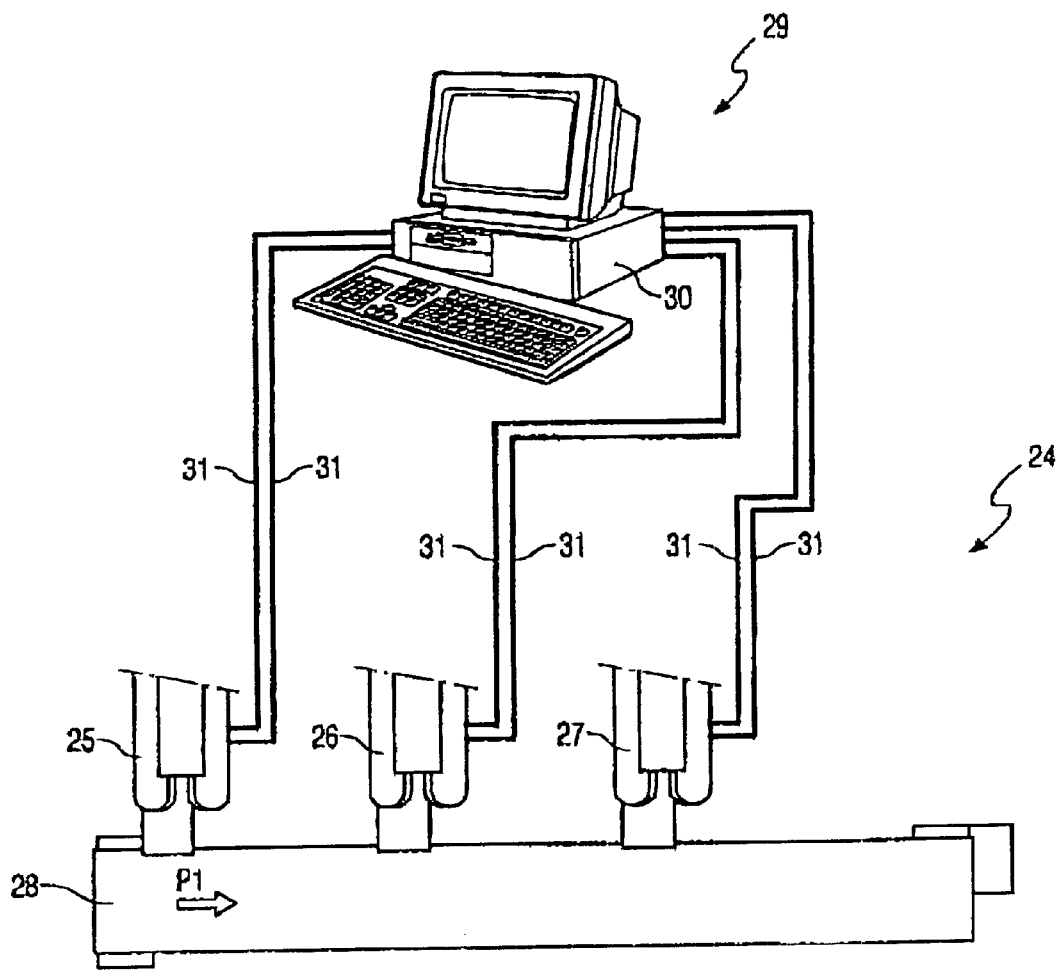

The present invention will be further elucidated with reference to the non-limitative embodiments shown in the following figures. Herein:

FIG. 1 shows a partly cut-away perspective view of an apparatus according to the invention, and FIG. 2 shows a schematic top view of an apparatus according to the invention in which three stunning devices connect onto a conveyor.

FIG. 1 shows an apparatus 1 according to the invention with a belt conveyor 2 onto which connect two stunning devices 3, 4. To both the first stunning device 3 and second stunning device 4 are supplied live pigs 5 which are carried by belly conveyors 6 to electrode assemblies 7. Electrode assemblies 7 are screened by cage constructions 8 to prevent accidents. Stunning devices 3, 4 connect onto belt conveyor 2 by means of guides 9. The figure shows that a stunned pig 10 is just leaving stunning device 3.

A pig 11 stunned earlier by stunning device 3 is already situated on belt conveyor 2. The distance between the rearmost stunned pig 11 lying on belt conveyor 2 and the preceding stunned pig 12 placed on belt conveyor 2 is so large that there is still space to accommodate a stunned pig 13 fed by the second stunning device 4. At the side of belt conveyor 2 a slaughterer 14 is located at a position where belt conveyor 2 has already passed the second stunning device 4. Slaughterer 14 sticks the stunned pigs 10, 11, 12, 13, whereby the blood drains therefrom lying in prone position. Belt conveyor 2 is provided with alternately placed long slats 15 and shorter slats 16 so that the blood released during bleeding can be drained through belt conveyor 2. This figure shows clearly that the stuck pigs 17 lie at short mutual distances on belt conveyor 2, for instance at a pitch of 900 mm, so that the capacity of belt conveyor 2 and the subsequent processing stations can be optimally utilized.

The production of the first stunning device 3 can be derived from a signal coming from a sensor 18. Sensor 18 is arranged in first stunning device 3 at a position such that it is certain that after a determined period a stunned pig 10 will leave the device. Sensor 18 is preferably arranged as far as possible to the rear in first stunning device 3 so that the moment at which pig 10 will leave device 3 can be precisely determined. The signals generated by sensor 18 are fed to a computer 20 by means of a signal line 19. Computer 20 then actuates the production of second stunning device 4 by means of a control line 21. In a stand-alone arrangement of stunning device 3, but also in a multiple arrangement, it is possible for the control line 21 to feed back directly to stunning device 3 in which sensor 18 is arranged. With the embodiment shown in the figure relatively large spaces between sunned pigs 11, 12 placed successively on belt conveyor 2 can be filled with pigs 13 stunned by second stunning device 4. It is thus also possible for instance for the second stunning device 4 to stun a plurality of pigs in rapid succession in the case that the feed of first stunning device 3 is halted for a time. With the apparatus 1 as shown it is possible to supply stunned pigs via belt conveyor 2 at intervals of 3 seconds. Apparatus 1 therefore has a capacity of 1200 animals per hour. A stand-alone disposition of stunning device 3 in combination with belt conveyor 2 provides an apparatus with a capacity of 600 stunned animals per hour For an even more precise regulation of the process the apparatus can be provided with at least one sensor 22 which is placed at the side of belt conveyor 2 and which is connected by means of signal line 23 to computer 20. By regulating the stunning process subject to measurement signals from sensor 22 the distribution with which stunned animals are placed by stunning devices 3, 4 onto belt conveyor 2 has no or less influence on the intervals at which the stuck pigs 17 lie on belt conveyor 2. For even more precise control of the spacing between stuck pigs 17 it is also possible to place a displaceable stop, not shown in this figure, above belt conveyor 2 so that the stunned animals 11, 12, 17, whether stuck or not, can be stopped for a time as required. Belt conveyor 2 herein moves through beneath the stopped animal 11, 12, 17 so that the position of animal 11, 12, 17 changes on the belt. When animal 11, 12, 17 occupies a desired position the displaceable stop is displaced such that animal 11, 12, 17 has a clear passage. In the arrangement shown in this figure the first stunning device 3 can be designated as "master", while second stunning device 4 is an additional device. It is also possible to combine a measuring and control system with belt conveyor 2 and stunning devices 3, 4 which is otherwise embodied, whereby second stunning device 4 can also be utilized as master. In that case the modified measuring and control system must at least be provided with an additional sensor which is arranged in second stunning device 4 and an additional control line must run from computer 20 to first stunning device 3 It is generally less desirable to employ the second stunning device 4 as master because the feedback time to first stunning device 3 on detection of an insufficient loading of second stunning device 4 is shorter than in the shown situation. It may nevertheless be desirable in exceptional circumstances to employ the second stunning device 4 as master, in order to load the two stunning devices 3, 4 more or less proportionally and/or to enable maintenance of first stunning device 3.

FIG. 2 shows a schematic top view of an apparatus 24 according to the invention in which three stunning devices 25, 26, 27 connect onto a conveyor 28 for discharge of the stunned pigs. The transporting direction of conveyor 28 is indicated by means of arrow P1. The production of the individual stunning devices 25, 26, 27 can be detected and actuated by means of measuring and control means 29 consisting of a computer 30 and diverse signal and control lines 31.

Although the apparatus is elucidated with reference to only a few embodiments, it will be apparent to all that the invention is in no way limited to the described and shown embodiments. On the contrary, many variations remain possible for a skilled person withing the scope of the invention.

What is claimed is:

1. An apparatus for stunning animals for slaughter comprising:

a) a conveyor for conveying stunned animals for slaughter;
   b) at least two stunning devices for stunning animals comprising a first stunning device and a second stunning device, wherein the animals stunned by the first and second stunning devices are delivered onto the conveyor after stunning; and
   c) means for detecting animals stunned by the first stunning device and regulating the flow of animals through the second stunning device based on detection of animals stunned by the first stunning device.

2. The apparatus as claimed in claim 1, wherein the means is coupled to the first and second stunning devices and is adapted to regulate the flow of animals through the first and second stunning devices to deliver stunned animals onto the conveyor at constant time intervals.

3. The apparatus as claimed in claim 2, wherein the means and the first and second stunning devices are adapted to accelerate and decelerate the rate by which the first and second stunning devices produce stunned animals.

4. The apparatus as claimed in claim 1, wherein the conveyor is divided into a plurality of segments, wherein the segments are connect successively onto each other and are capable of being operated at different speeds.

5. The apparatus as claimed in claim 1, wherein the apparatus is provided with correction means for displacing animals for slaughter relative to the conveyor.

6. The apparatus as claimed in claim 5, wherein the correction means are either formed integrally or non-integrally with the conveyor.

7. The apparatus as claimed in claim 1, wherein the at least two stunning devices operatively connect successively to the conveyor, and wherein the first stunning device is operatively connected to the conveyor upstream from the second stunning device.

8. The apparatus as claimed in claim 1, wherein the means further comprises at least one sensor for detecting the stunned animals produced by the first stunning device.

9. The apparatus as claimed in claim 8, wherein the at least one sensor generates data based on its detection of stunned animals and wherein the means further comprises a computing device for receiving the data from the at least one sensor and converting and data into control signals.

10. The apparatus as claimed in claim 9, wherein the computing device is provided with input means for inputting data used to control stunned animal production.

11. The apparatus as claimed in claim 1, wherein at least one of the at least two stunning devices is provided with a belly conveyor for transporting the animals for slaughter in the stunning device.

12. The apparatus as claimed in claim 1, wherein at least one of the at least two stunning devices is selected from the group consisting of an electrical stunning means and a gas stunning means.

13. The apparatus as claimed in claim 1, wherein the conveyor is a belt conveyor for prone transport of stunned animals for slaughter.

14. A method for stunning animals for slaughter, the method comprising:
   stunning the animals using a first stunning device, thereby producing stunned animals;
   feeding the animals stunned by the first stunning device onto a conveyor; and
   regulating the flow of animals through a second stunning device based on outfeed of stunned animals from the first stunning device.

15. The method as claimed in claim 14, further comprising feeding the animals stunned by the second stunning device onto the conveyor, wherein the feeding of animals stunned by the first stunning device is regulated such that stunned animals are fed onto the conveyor at constant time intervals.

16. The method as claimed in claim 14, wherein regulating the flow of animals through the second stunning device is accomplished by accelerating and decelerating the rate at which animals are supplied to the second stunning device.

17. The method as claimed in claim 14, further comprising feeding the animals stunned by the second stunning device onto the conveyor, wherein animals stunned by the first stunning device are fed onto the conveyor at a first position along the conveyor and animals stunned by the second stunning device are fed onto the conveyor at a second position along the conveyor, wherein the first position is upstream of the second position.

18. The method as, claimed in claim 17, further comprising the step of stunning animals for slaughter by means of electricity or gas.

\* \* \* \* \*

UNITED STATES PATENT AND TRADEMARK OFFICE
CERTIFICATE OF CORRECTION

PATENT NO. : 6,473,287 B1 Page 1 of 1
DATED : October 29, 2002
INVENTOR(S) : Sander Antonie Van Ochten and Ronald Theodoor Duitshof It is certified that error appears in the above-identified patent and that said Letters Patent is hereby corrected as shown below:

Column 1,
Line 14, delete "sued" and insert -- stunned -- in place thereof
Line 34, delete "annual" and insert -- animal -- in place thereof
Line 37, delete the comma following the word "means"
Line 48, delete the period following the word "stunning"

Column 3,
Line 38, delete "annals" and insert -- animals -- in place thereof

Column 4,
Line 46, delete "daring" and insert -- during -- in place thereof

Column 5,
Line 45, delete "sunned" and insert -- stunned -- in place thereof

Signed and Sealed this

Twenty-fifth Day of February, 2003

JAMES E. ROGAN
*Director of the United States Patent and Trademark Office*